Nov. 3, 1970     H. P. MARKANT ET AL     3,537,820
METHOD OF AND APPARATUS FOR ANALYZING A CHEMICAL COMPOSITION
Filed Sept. 14, 1966     5 Sheets-Sheet 1

INVENTORS
Henry P. Markant
Indravadan S. Shah
Norbert Soltys
BY
ATTORNEY

United States Patent Office 3,537,820
Patented Nov. 3, 1970

3,537,820
METHOD OF AND APPARATUS FOR ANALYZING A CHEMICAL COMPOSITION
Henry P. Markant, Alliance, Ohio, Indravadan S. Shah, Forest Hills, N.Y., and Norbert Soltys, Alliance, Ohio, assignors to The Babcock & Wilcox Company, New York, N.Y., a corporation of New Jersey
Filed Sept. 14, 1966, Ser. No. 579,307
Int. Cl. G06f 15/46; G06g 7/58; G01n 27/10
U.S. Cl. 23—230
16 Claims

ABSTRACT OF THE DISCLOSURE

A control system for regulating the composition of a chemical fluid wherein simultaneous measurements of at least two physical characteristics of the chemical fluid are converted to mathematical relationships and thereafter correlated to determine the composition preparatory to corrective changes to the fluid.

---

This invention relates to a system for determining certain of the ingredients in a chemical composition by the determination and correlation of two or more physical characteristics. More particularly the invention relates to a method of and apparatus for commercially determining certain physical characteristics or properties of a solution and mathematically correlating these characteristics or properties to determine the amount of certain of the ingredients in the solution and to thereby regulate additions to the solution to establish and maintain a desired chemical composition.

In many industrial processes chemical compositions are utilized to effect changes in materials leading either directly or indirectly to a finished product. In such processes, changes in the chemical composition cause corresponding changes in the product of the process. In some processes an indication of one property or characteristic of the solution, for example pH values, may be sufficient for adequate regulation of the composition. In other processes the chemical composition has been regulated by batch analysis by means of titration or similar processes and in some cases more or less continuous analysis has been obtained by colorimetric procedures which necessitate the preparation of known strengths of chemical reactants to cause the desired color changes in the solution. Many of the industrial processes, however, have a need for a continuous and effective determination of the chemical composition, particularly when the more simple tests such as pH and color comparisons are inadequate.

The present invention is directed to a procedure which involves the determination of at least two properties of a chemical solution where the properties so determined may be correlated for an accurate determination of some of the ingredients in the chemical composition of the solution so tested. With accurate determinations and proper correlations of such measurements the invention further provides a device for interpreting the correlations and to thereby effect corrective measurements so as to maintain a preferred chemical composition in the solution.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

Figure 1:
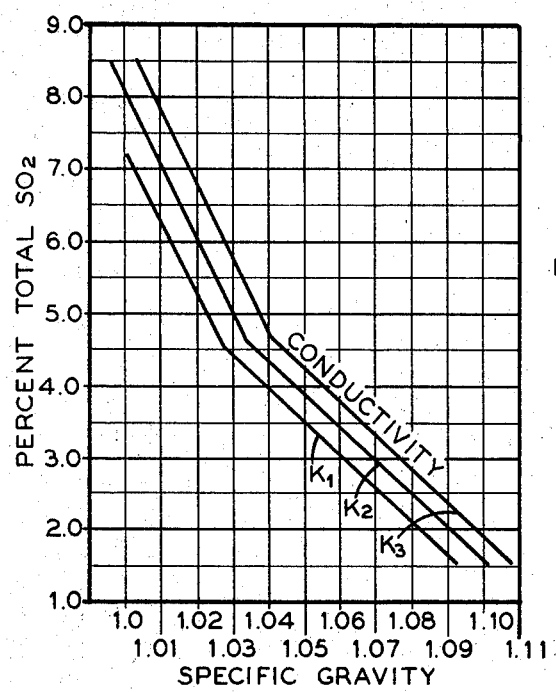
FIGS. 1 and 2 are plots showing the correlation of specific gravity and conductivity to percent total $SO_2$ and percent combined $SO_2$ respectively.

It will be understood the present invention is applicable to the continuous determination of the chemical constituents in many simple chemical compositions by the measurement of characteristics of the composition and mathematical correlations of such characteristics. In chemical solutions having four chemical elements, for example in the system MgO, $H_2O$ and $SO_2$, magnesium and sulphur may be combined in the forms of magnesium monosulphite and magnesium bisulphite. In such a solution, a knowledge of its composition is desirable and important in pulp digestion and in the recovery of chemicals from the pulping process. The invention is equally applicable to determinations in other chemical solutions, such as pulp cooking liquors of the sodium, ammonium and calcium base.

Characteristic measurements of a solution which are useable in the invention include specific gravity, electrical conductivity, viscosity, surface tension, vapor pressure, density and light transmission. The particular measurements used will depend upon the accuracy of the mathematical expressions developed from such determinations.

In an example of the present invention, measurements of the electrical conductivity, and the specific gravity of the solution have been selected for a highly accurate determination of the chemical composition of a solution formed from the components MgO, $H_2O$ and $SO_2$. These particular determinations have been selected due to the availability of reliable and accurate instruments for such determinations and experience in converting such measurements into mathematical expressions which may be correlated for accurate and consistent results.

In the embodiment of the invention an example of the application of the invention to the pulp and paper industry is described. More specifically the following description will relate to the recovery of $SO_2$ gases contained in the products of combustion resulting from the incineration of magnesium base residual liquor obtained from the digestion process of cellulosic material. In the example of the invention the combustion of the residual liquor produces reuseable dry particles of magnesium oxide and gaseous $SO_2$ which can be recombined to form magnesium bisulphite and which may be reused in the pulp digesting procedure. As pointed out in U.S. Pat. 3,273,961 the most effective $SO_2$ absorption can be obtained by the use of a carefully controlled chemical composition of the spray liquid introduced into the $SO_2$ containing combustion gases. Some of the variables involved in the $SO_2$ absorption include gas and liquid temperatures and solution concentrations where the $SO_2$ absorption is obtained by the chemical reaction of the $SO_2$ with magnesium monosulphite. Advantageously the magnesium monosulphite content of the sprayed liquid should be as high as possible without precipitation of the monosulphite in the solution. As pointed out in said U.S. patent the solubility of the magnesium monosulphite is dependent upon the temperature of the specific solution which governs the solubility limit of the magnesium monosulphite in the solution.

The chemical reactions involved in the absorption of $SO_2$ in a magnesium base solution can be expressed by the following equations:

(1) $Mg(HSO_3)_2(Excess) + MgO + H_2O \rightarrow Mg(HSO_3)_2 + 2MgSO_3 + 2H_2O$ (2) $MgSO_3 + SO_2 + H_2O \rightarrow Mg(HSO_3)_2$ Thus magnesium bisulphite, $Mg(HSO_3)_2$, is reacted with magnesium oxide and water ($MgO + H_2O$) or magnesium hydroxide $Mg(OH)_2$ to convert some of the bisulphite to magnesium monosulphite ($MgSO_3$). The magnesium monosulphite in the solution absorbs sulphur dioxide ($SO_2$) in the gas upon intimate contact therebetween to form the bisulphite. In the $SO_2$ absorption system, the spray liquid will contain both magnesium bisulphite and magnesium monosulphite with the latter advantageously being maintained as close to the solubility limit as possible for the prevailing conditions of temperature, for maximum $SO_2$ absorption.

The liquid solution sprayed into the $SO_2$ containing gases contains as active ingredients $Mg(HSO_3)_2$, $MgSO_3$, and $H_2O$. For purposes of comparison of the composition in terms of the $SO_2$ content according to standard terminology prevalent in the Pulp and Paper Industry (see Data Sheet C–00c, June 1955 of the Technical Section, Canadian Pulp and Paper Association) this can be expressed as follows:

$$\underset{(1)}{MgSO_3 \cdot H_2SO_3} + \underset{(2)}{MgSO_3} + \underset{(3)}{H_2O}$$

Total $SO_2 = (SO_2)$ from $MgSO_3$, term (1) + $(SO_2)$ from $H_2SO_3$ (Item 1) + $(SO_2)$ from $MgSO_3$, term (2); combined $SO_2 = (SO_2)$ from $MgSO_3$ (1) + $(SO_2)$ from $MgSO_3$ (2); free $SO_2 = (SO_2)$ from $H_2SO_3$; and $SO_2$ as $MgSO_3 = (SO_2)$ from $MgSO_3$ (2). Knowledge of any two of the four variables namely total $SO_2$ (T), combined $SO_2$ (C), free $SO_2$ (F) or $SO_2$ as $MgSO_3$ (M) will determine the complete composition of the liquor. For example, if total $SO_2$ and combined $SO_2$ are known then;

Free $SO_2$ = (Total $SO_2$ — Combined $SO_2$)

and $SO_2$ as $MgSO_3$ = (Combined $SO_2$ — Free $SO_2$)

Figure 2:
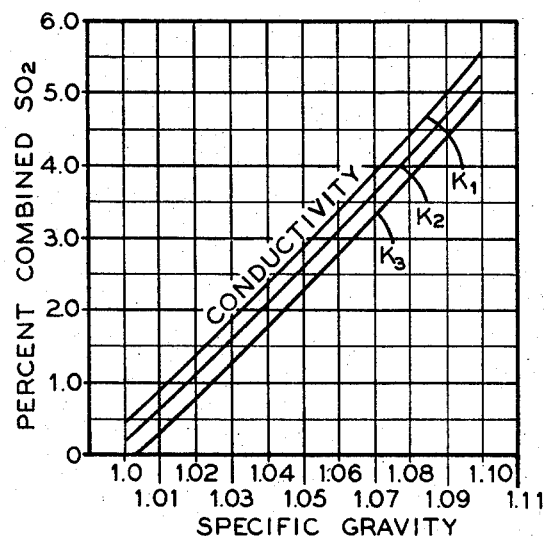

From electrical conductivity and specific gravity measurements of a magnesia-base solution, the total $SO_2$ (T) and combined $SO_2$ (C) can be determined using the following mathematical expressions:

(1) Percent Total $SO_2(T) = [a_1 + a_2(S.G.)] + [a_3 + a_4(K) + a_5(K)^2]$ (2) Percent Combined $SO_2(C) = [b_1 + b_2(S.G.) + b_3(S.G.)^2] + [b_4 + b_5(K)]$ Graphically the relationship between percent total $SO_2$, percent combined $SO_2$, specific gravity and conductivity is shown in FIGS. 1 and 2. Referring to FIG. 1, we show a plot of specific gravity versus percent total $SO_2$ with constant conductivity as parameters ($K_3 > K_2 > K_1$). It shows that, for a constant percent total $SO_2$ concentration, specific gravity of the acid increases with the increase in conductivity. The plot of FIG. 2 shows specific gravity versus percent combined $SO_2$ with constant conductivity as parameters ($K_3 > K_2 > K_1$). FIG. 2 also shows that, for a constant concentration of combined $SO_2$ and for an increasing value of specific gravity the electrical conductivity increases linearly, but at a different rate.

Figure 3:
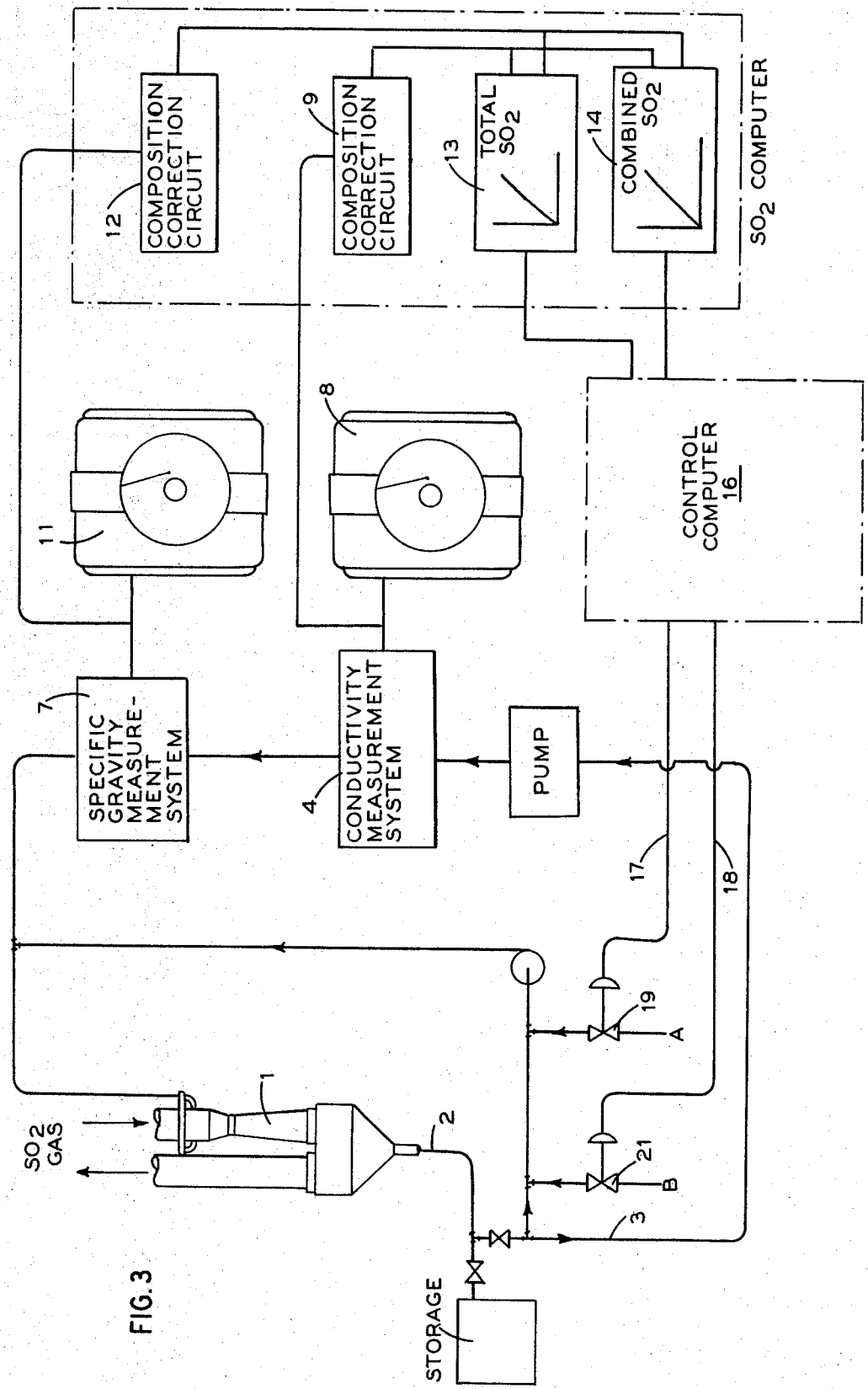
FIG. 3 is a block diagram of a magnesia-base constant-composition acid control system.

Referring to FIG. 3, we show the application of our invention to a magnesium-base absorption system. A sample is withdrawn from the spray acid line, passed through a conductivity measuring device and a specific gravity measuring instrument before being returned to the spray acid line. The conductivity and specific gravity signals are corrected to standard temperature and chemical composition levels and combined in function generators to compute percent total $SO_2$ and percent combined $SO_2$. These computed $SO_2$ signals are the inputs to an analog control system for controlling the addition of $Mg(OH)_2$ and $H_2O$ to the spray acid line to maintain a constant-composition spray acid.

In particular we show in FIG. 3, a venturi absorber 1 for preparing the constant-composition product acid for use in a sulphite pulp process. To maintain the product acid constant, we maintain the spray acid composition constant by the addition of $H_2O$ and $Mg(OH)_2$. The spray acid is made up of $Mg(HSO_3)_2$, $MgSO_3$, and $H_2O$ and the $SO_2$ gas is absorbed in accordance with the reaction:

$$MgSO_3 + SO_2 + H_2O \rightarrow Mg(HSO_3)_2$$

If the total $SO_2$ concentration of the acid increases and the monosulphite concentration decreases then, to maintain the desired spray acid composition $H_2O$ must be added to lower the $SO_2$ concentration and $Mg(OH)_2$ added to increase the monosulphite concentration. To maintain the spray acid concentration constant, part of the product acid is withdrawn from the absorber 1 by means of a spray acid pipe 2 and returned to the absorber through the venturi shaped absorber top. Connected to the spray acid line 2 is a sample pipe 3 for obtaining a representative sample of acid for composition analysis purposes. First, conductivity of the sample is measured by a conductivity system 4 from a constant flow pump 6. Because of the nature of the spray acid an electrodeless conductivity system is preferred, typical of such systems is one manufactured by Industrial Instruments, Inc., designated as model No. RS4. Next, the constant flow spray acid sample passes through a specific gravity measuring device 7, such as manufactured by Nuclear Chicago Co. and designated as Model No. 506, Density Gage. The spray acid sample is then returned to the spray acid pipe 2 and remixed with the spray acid before being returned to the venturi absorber 1.

Both the conductivity and the specific gravity of the sample are affected by the acid sample temperature. An increase in temperature causes a negative error to appear in the specific gravity signal, this error can be compensated for by adding a voltage (proportional to the difference in temperature from a reference value) to the measured specific gravity signal. The specific gravity measuring device 7 includes a means for automatically performing this temperature correction. Temperature also has a significant effect on acid conductivity, an increase in acid temperature resulting in the measured reading indicating higher than actual. For a given acid composition the measured value will have a positive error proportional to the difference in temperature from 25° C. base. To overcome this temperature effect, a known thermistor-resistor network compensates the measured value. The conductivity measurement system 4 includes means for performing this temperature correction automatically.

The equations previously set forth to correlate specific gravity and conductivity are based on a magnesium-base acid prepared from technical grade MgO and pure $SO_2$ gas. In industry, the acids are prepared by using recovered or commercial MgO and a gas mixture containing $SO_2$ and $SO_3$ in addition to other gases. The $SO_3$ gas and other impurities will appear as sulphate and other dissolved substances in the acid that tend to increase the conductivity signal and decrease the specific gravity signal. For any particular plant, the quantities of sulphates and other dissolved substances will be essentially constant. To compensate for composition error, we subtract a given voltage signal from the conductivity signal by means of a composition correction circuit 9 and add a constant voltage to the specific gravity reading by means of a composition correction circuit 12. The temperature corrected conductivity signal is recorded in a recorder 8 and connected to the input of the composition correction circuit 9. Similarly, the temperature corrected specific gravity signal is recorded in a recorder 11 and connected to the input of the composition correction circuit 12.

The specific gravity and conductivity signals are corrected for both temperature and composition effects. These can be correlated in accordance with Equations 1 and 2 to compute the percent total $SO_2$ and percent combined $SO_2$. Percent total $SO_2$ is computed in a function generator 13 having input signals from the composition correction circuits 9 and 12. Percent combined $SO_2$ is computed by a function generator 14 also having as inputs the output signals from the composition circuits 9 and 12.

Output signals from the function generators 13 and 14 are connected to a control computer 16 wherein they are compared to pre-determined setpoint signals. If the difference between the function generator outputs and their respective setpoint signals is zero, the spray acid composition is at its desired value. If a difference exists between the function generator outputs and their respective setpoints then the control computer 16 generates control signals to position control valves 19 and 21. The control valve 19 connects to the control computer 16 by means of a line 17 and controls the addition of water via line A to the spray acid line 2. Line 18 connects the control valve 21 to the control computer 16, the control valve 21 controls the addition of magnesium hydroxide via line B to the spray acid line 2. It will be understood the output from the control computer 16 can be arranged to indicate or record the values of total and combined $SO_2$ in the chemical solution being analyzed, with or without the controlled regulation of the valves 19 and 21. Furthermore the same instrument may also be used to intermittently or cyclically measure a plurality of different chemical solutions.

Figure 4:
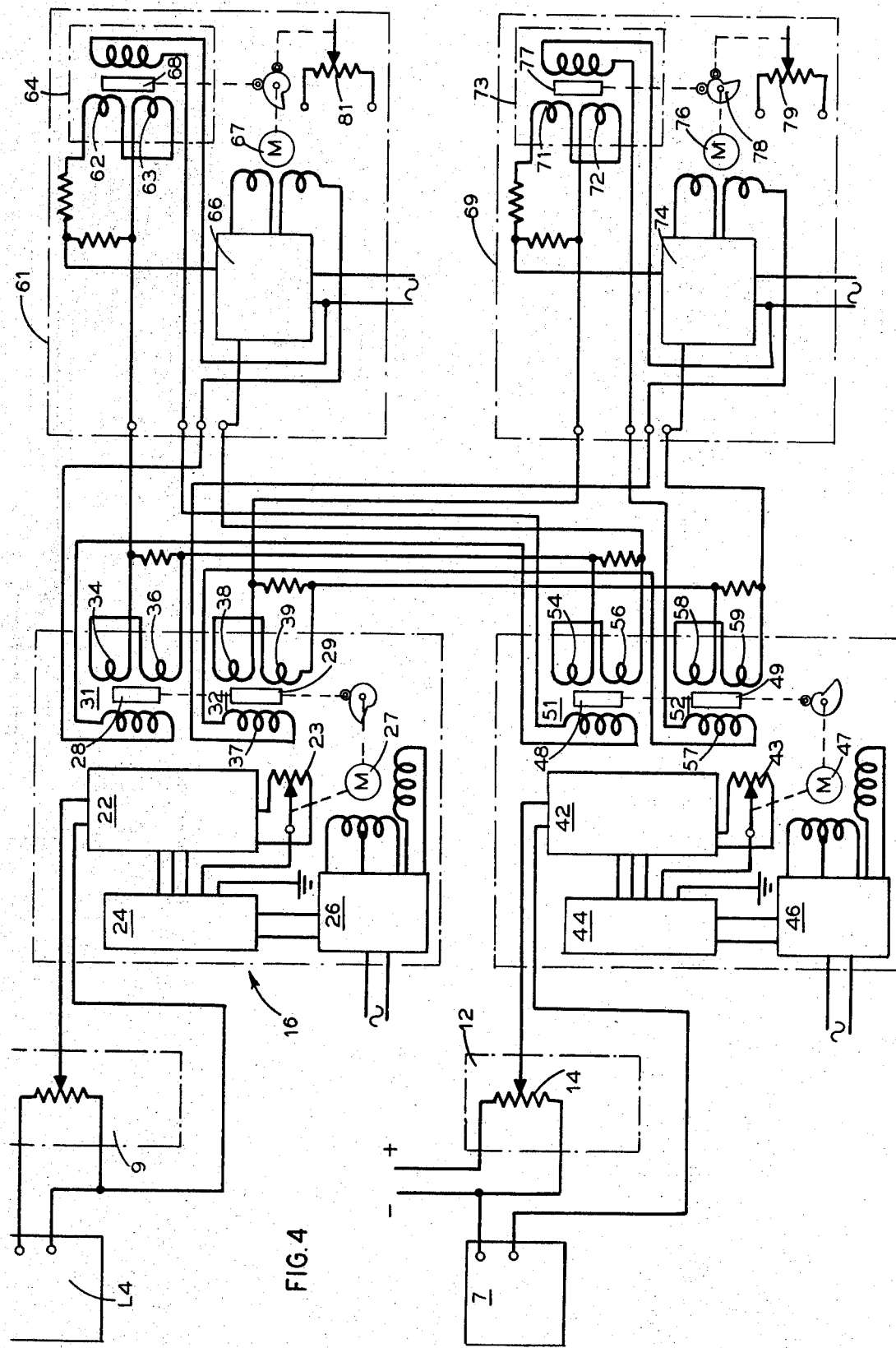
FIG. 4 is a schematic diagram of a typical control system to compute the percent total $SO_2$ and percent combined $SO_2$.

Referring to FIG. 4, we show in detail the $SO_2$ control computer 16 of FIG. 3, including composition correction circuits and function generator units. The conductivity system 4, not shown in FIG. 4, connects to the composition correction circuit 9 which, in its simplest form, is a potentiometer or voltage dividing network. As discussed previously, the conductivity measurement must be corrected to a standard composition. After correction by the composition circuit 9, the conductivity signal connects to the input of a D.C. potentiometer circuit 22 that includes a potentiometer 23. The conductivity signal is compared to the wiper arm voltage of the potentiometer 23 and the difference connected to the input of an amplifier 24. Connected to the amplifier output, is a motor controller circuit 26 for generating an energizing signal for a two-phase servo-motor 27 having a shaft mechanically connected to the wiper arm of the potentiometer 23. Also mechanically connected to the servo-motor shaft are two movable cores 28 and 29 of movable core transformers 31 and 32 respectively. The movable core transformer 31 has a primary winding 33 and two serially connected secondary windings 34 and 36, likewise the movable core transformer 32 has a primary winding 37 and two serially connected secondary windings 38 and 39. As is well known, the voltage developed across the secondary winding of a movable core transformer varies with the movable core position. In our system, the voltages of the secondary windings vary directly with spray acid conductivity.

Using a system somewhat similar to the conductivity system, the specific gravity measurement signal from the specific gravity device 7, connects to the composition correction circuit 12, here shown in the form of a potentiometer 41 connected to a source of direct current, not shown. As already stated specific gravity compensation adds a given voltage to the measured value to compensate for composition variation. The temperature corrected specific gravity signal and the composition correction factor are combined and connected to the input of a function generator 14, in which the compensated specific gravity signal connects to a potentiometer circuit 42 including a potentiometer 43. A comparison of the corrected specific gravity signal and the wiper arm voltage of the potentiometer 43 is made and the difference connected as the input of an amplifier 44. A motor control circuit 46 responds to the amplifier output and energizes a servo-motor 47 having its armature shaft mechanically connected to position the wiper arm of the potentiometer 43. Also connected to the armature shaft of the servo-motor 47 are two movable cores 48 and 49 of movable core transformers 51 and 52 respectively. The movable core transformer 51 has a primary winding 53 connected to a suitable source of alternating current, and two serially connected secondary windings 54 and 56. The movable core transformer 52 is identical to the transformer 51 and has a primary winding 57 and two serially connected secondary windings 58 and 59.

Thus, the conductivity signal generates two independent voltages at the seconrary windings of the transformers 31 and 32 and the specific gravity signal generates two independent voltages at the secondary windings of the transformers 51 and 52. These four independent voltages are combined by interconnecting the secondary windings as shown in FIG. 4.

Specifically, the secondary windings of the transformer 31 are serially connected to the secondary windings of the transformer 51 with the resultant voltage signal connected to the input of an A.C. ratio circuit 61. Within the ratio circuit 61, the voltage at its input is compared with the voltage across a pair of secondary windings 62 and 63 of a movable core transformer 64. A difference between the input and internally generated voltage signals is connected as the input to an amplifier and motor control circuit 66. Responsive to the output of the amplifier and motor control circuit 66 is a two-phase servo-motor 67 having its armature shaft mechanically-connected to a movable core 68 of the transformer 64. The servo-motor continues to position the movable core 68 until the difference voltage between the ratio circuit input and the secondary windings of the transformer 64 is zero. Also positioned by the servo-motor 67 is the wiper arm of a potentiometer 81; the voltage between the wiper arm of the potentiometer and ground represents the percent total $SO_2$ of the acid composition.

In an identical manner, the voltages of the secondary windings of the movable core transformers 32 and 52 are combined and conected as the input signal to an A.C. ratio circuit 69. A voltage developed across the secondary windings 71 and 72 of a movable core transformer 73 is compared with the ratio circuit input signal and the difference connected to the input terminals of an amplifier and motor control circuit 74. After amplification, the voltage input to the motor control circuit 74 energizes a two-phase servo-motor 76 which has its armature shaft mechanically-connected to a movable core 77 of the transformer 73 by means of a cam 78. Also connected to the armature shaft of the servo-motor 76 is the wiper arm of the potentiometer 79. The voltage signal between the wiper arm of the potentiometer 79 and ground represents the percent combined $SO_2$ of the acid composition. This signal and the signal from the potentiometer 81 are combined in the control computer 16 to control the acid composition to the desired specific gravity and conductivity level.

Figure 5:
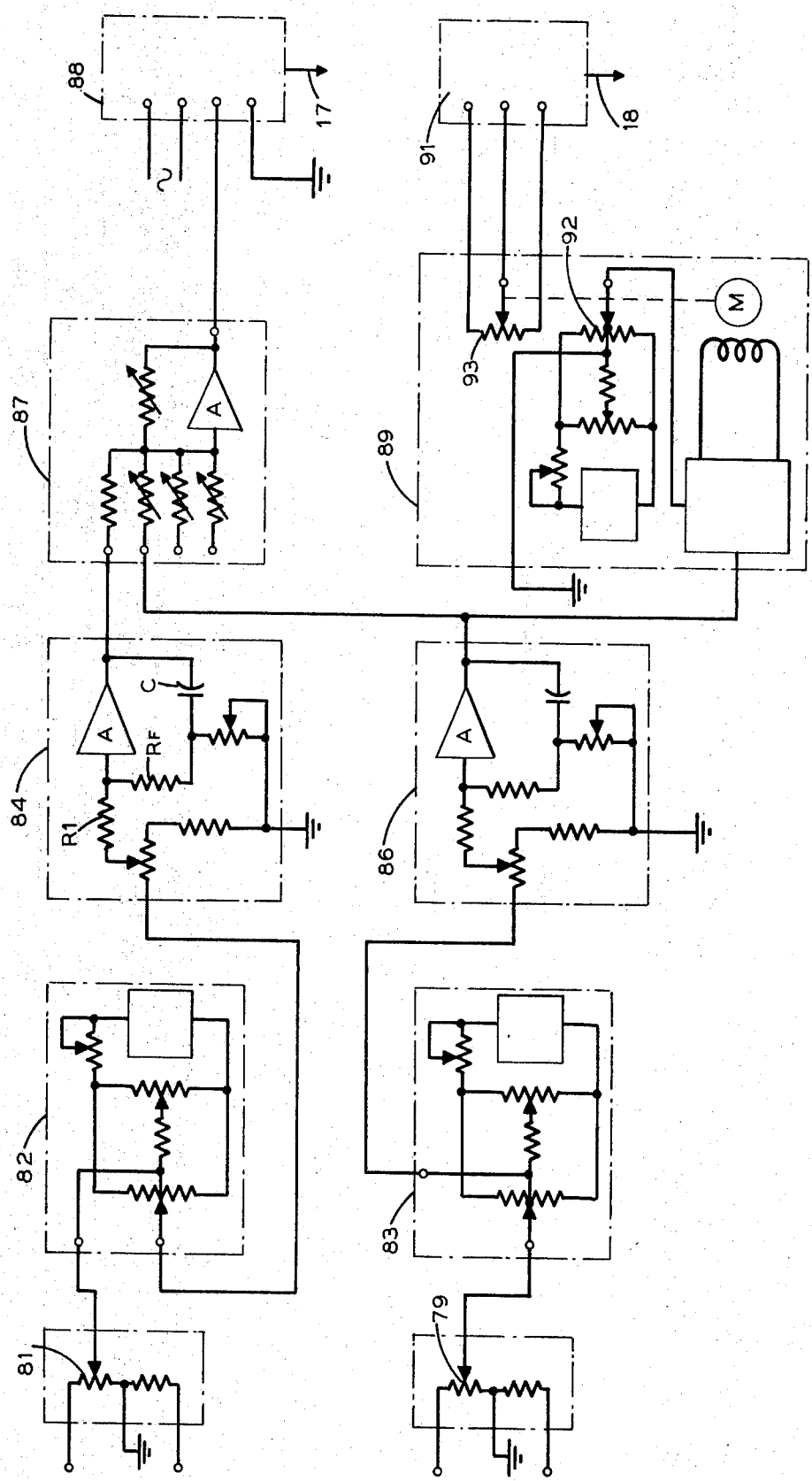
FIG. 5 is a schematic diagram of an analog control system to maintain given values of specific gravity and conductivity.

Referring to FIG. 5, we show in detail a typical computer control system including the potentiometers 79 and 81 connected to sources of direct current, not shown. The wiper arm of potentiometer 81 conects to an adjustable signal generator 82 and the wiper arm of potentiometer 79 connects to an identical adjustable signal generator 83. These generators are adjustable sources of direct current for establishing the desired level of percent total $SO_2$ and percent combined $SO_2$, adjustable generator 82 establishes the desired level of percent total $SO_2$ and the adjustable generator 83 establishes the desired level of percent combined $SO_2$. When the wiper arm voltage of the potentiometer 81 does not vary from the setpoint voltage of the adjustable generator 82 the percent total $SO_2$ of the acid composition is at the desired level and when the wiper arm voltage of the potentiometer 79 equals the setpoint voltage of the adjustable generator 83 the percent combined $SO_2$ of the acid composition is also at the desired level.

If the percent total $SO_2$ varies from that desired, an error signal will be generated at the output of the adjustable generator 82, this signal connects to the input of a proportional integral controller 84. Operation of controllers of this type is well known, it includes an operational amplifier A, a feedback capacitor C and an input resistor $R_1$ and a feedback resistor $R_f$. The output of a proportional plus integral controller varies proportionally to and as the time integral of its input (error) signal.

A deviation of the percent combined $SO_2$ from its desired level generates an error signal at the output of the adjustable generator 83 which connects to the input of a proportional plus integral controller 86 that is identical to the proportional plus integral controller 84.

The output signals of these controllers connect to the input resistors of a summing controller 87, the summing controller output varies proportionally to the sum of its input signals. Here the summing controller output determines the required water addition to the spray acid pine line 2. Control of water addition is by means of a control valve 19 that receives a control signal from an electric to pneumatic converter 88 connected to the output of the summing controller 87. An electric to pneumatic converter of the type we employed is fully described in the United States Pat. No. 3,080,878 issued to Dustin et al.

Control of magnesium hydroxide addition is by means of a servo-multiplier 89 connected to the output of the proportional plus integral controller 86. Servo-multiplier 89 includes an amplifier for comparing the servo-amplifier input with an adjustable voltage of a potentiometer circuit. The amplifier output energizes a servo-motor that is mechanically-connected to the wiper arm of a potentiometer 92. The servo-motor positions the wiper arm of the potentiometer 92 until the voltage of the potentiometer circuit equals the multiplier input. Also mechanically-connected to the servo-motor is the wiper arm of a potentiometer 93, the wiper arm voltage of potentiometer 93 varies in accordance with deviation of percent combined $SO_2$ from its setpoint. The wiper arm of potentiometer 93 is electrically connected to an electric pneumatic converter 91 for the control valve 21.

In operation of our system, magnesium-base acid is circulated through the spray acid pipe 2; by means of the conductivity system 4 and the specific gravity device 7 the acid's conductivity and specific gravity are determined. Each of these measuring devices includes means for temperature compensating the measured readings to a standard 25° C. reading. In addition to temperature compensation, the measured variables must be compensated to a standard composition, this is accomplished in the compensating circuits 9 and 12. A change in the temperature and compensation corrected conductivity signal causes an error signal to be developed at the input of the amplifier 24; motor control 26 energizes the servo-motor 27 which positions movable cores 28 and 29 of the movable core transformers 31 and 32. A change in the temperature and composition corrected specific gravity signal causes a similar positional and compensating action through elements 42 and 44 to motor 47. Thus, the power output of secondary windings 34, 36 of transformer 31; 38, 39 of transformer 32; 54, 56 of transformer 51; and 58, 59 of transformer 52 can be made to vary in accordance with terms of Equations 1 and 2, set forth previously. It will be noted the cams connected to the motors 27, 47, 67 and 76 position the cores of the transformers 31, 32, 51, 52, 64 and 73 to regulate the operations of the control device. The cam surfaces are accurately formed to correspond with the mathematical correlations previously described, and to thereby effect the desired control functions. Specifically, voltages generated across the secondary windings of transformer 31 simulate a specific functional relationship and the voltage generated across the secondary windings of transformer 51 simulate a different specific functional relationship. By combining these voltage signals, the input to the ratio circuit 61 can be made to equal the percent total $SO_2$ of the acid composition. Thus, the position of the armature shaft of the servo-motor 67 varies in accordance with the percent total $SO_2$ of the spray acid. Similarly, the voltage generated across the secondary windings of transformer 32 equals a specific value and the voltage generated across the secondaries of transformer 52 equals a separate specific value. Combining these voltages results in the input to the ratio circuit 69 equaling the percent combined $SO_2$. The shaft position of the servo-motor 76, and in turn the wiper arm position of the potentiometer 92, varies in accordance with percent combined $SO_2$ of the spray acid In operation of our control computer, the wiper arm position of the potentiometer 81 varies with variation in percent total $SO_2$ while the wiper arm position of the potentiometer 79 varies with percent combined $SO_2$. Voltages developed between the potentiometer wiper arms and ground are compared to setpoint signals in order to determine the deviation of percent total $SO_2$ and percent combined $SO_2$ from their desired levels. For percent total $SO_2$ the setpoint voltage is established by the signal generator 82 while for percent combined $SO_2$ the setpoint signal is established by the signal generator 83. Deviation of percent total $SO_2$ from its setpoint generates an error signal that is amplified in the proportional plus integral controller 84 and a deviation of percent combined $SO_2$ generates a signal that is amplified in the proportional plus integral controller 86. After amplification, the setpoint deviation signals are combined and amplified in a summing controller 87. The output of summing controller 87 is a control signal to establish desired water addition. It positions the water control valve 19 through an e/p converter 88. Magnesium hydroxide is added to the spray acid pipe 2 by means of control valve 21 in accordance with the servo-multiplier output. Servo-multiplier 89 has as an input signal the time varying output of the proportional plus integral controller 86.

Thus water and magnesium hydroxide are added to the spray acid pipe 2 to maintain the desired values of specific gravity and conductivity which as is known will vary with acid composition. The steps required to maintain the desired acid composition include; measuring the specific gravity and conductivity, correcting for temperature and composition, calculating the percent total $SO_2$ and percent combined $SO_2$, comparing these calculated values to establish setpoints and controlling the water and magnesium hydroxide additions to maintain given amounts of percent total and percent combined $SO_2$ in the product acid.

There are other possible variations for effecting process control that can be made to the operation previously described. For example, instead of calculating percent total and percent combined $SO_2$, we could calculate percent total $SO_2$ and $SO_2$ as $MgSO_3$. The equation for percent total $SO_2$ was given previously, for $SO_2$ as $MgSO_3$ (M) the function generator would perform calculations in accordance with the following equation:

$$M = c_1 + c_2(K) + c_3(K)^2 + c_4(S.G.) + c_5(S.G.)^2$$

Figure 6:
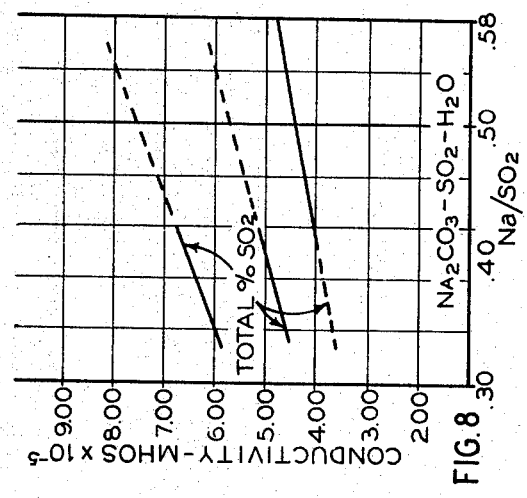
FIGS. 6 through 11 show curves similar to the curves of FIGS. 1 and 2, for other base pulp digestion liquors.
Figure 7:
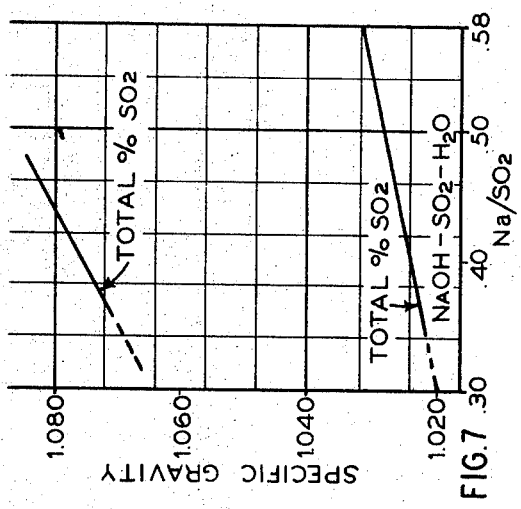
Figure 8:
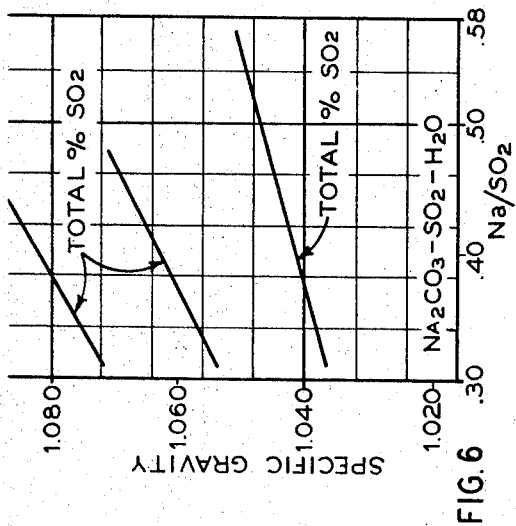
Figure 9:
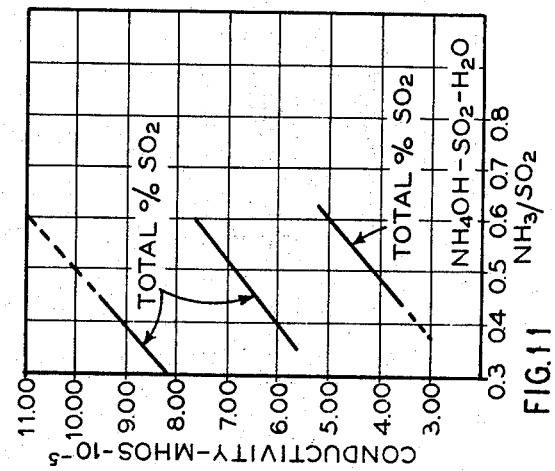

Our invention can be extended to be applicable to several other processes where it is desirable to measure and control acid to a constant composition, as for example in the field of sulphite pulp manufacture, where sodium hydroxide (NaOH) and ammonia ($NH_3$) are used as the bases for the product acid. As shown in FIGS. 6 and 7, for a constant total percent $SO_2$ by weight in either a $Na_2CO_3$—$SO_2$—$H_2O$ or a NaOH—$SO_2$—$H_2O$ system, the specific gravity increases as the ratio of total sodium (Na)

to total $SO_2$ increases. FIGS. 8 and 9 show that for a constant total percent $SO_2$ in either of the $$Na_2CO_3—SO_2—H_2O$$

or the $NaOH—SO_2—H_2O$ systems, the electrical conductivity increases as the ratio of total sodium (Na) to total $SO_2$ increases.

Figure 10:
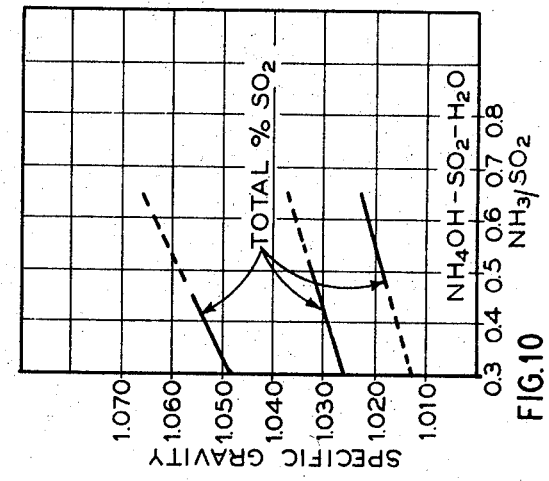
Figure 11:
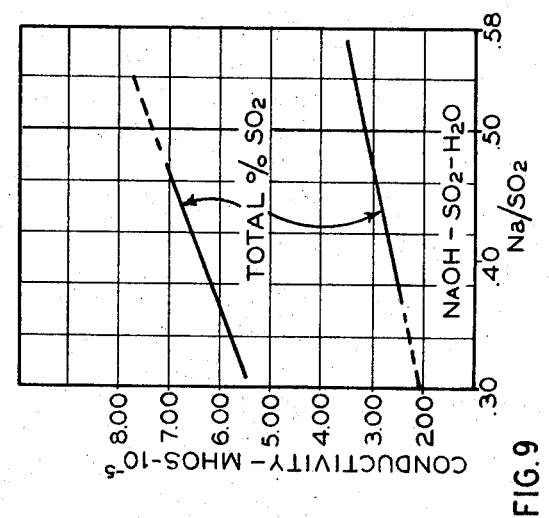

FIGS. 10 and 11 are plots showing characteristics of the ammonia-base solution. For a constant total percent $SO_2$ in the $NH_4OH—SO_2—H_2O$ system, specific gravity increases as the ratio of total ammonia ($NH_3$) to total $SO_2$ increases, while for a constant total percent $SO_2$ in a $NH_4OH—SO_2—H_2O$ system, electrical conductivity increases as the ratio of total ammonia ($NH_3$) to total $SO_2$ increases. It is evident that the solutions, FIGS. 6–11 inclusive, have strikingly similar characteristics. Moreover it should be apparent that FIGS. 6–11 are also similar to FIGS. 1 and 2 for the magnesia-base acid. Equations correlating specific gravity and conductivity, similar to those previously set forth for a MgO base acid, can be written for the ammonia and sodium-base acids also.

To further understand the applicability of our invention to the sodium and ammonia-base solutions, consider the following reactions that might occur:

(1) $Na_2CO_3+SO_2+H_2O \rightarrow Na_2SO_3+H_2O+CO_2\uparrow$
(2) $Na_2CO_3+2SO_2+H_2O \rightarrow 2NaHSO_3+CO_2\uparrow$
(3) $Na_2CO_3+3SO_2+H_2O \rightarrow$
    $2NaHSO_3+Na_2SO_3+2CO_2\uparrow$
(4) $2NaOH+SO_2+H_2O \rightarrow Na_2SO_3+2H_2O$
(5) $NaOH+SO_2+H_2O \rightarrow NaHSO_3+H_2O$
(6) $3NaOH+2SO_2+2H_2O \rightarrow Na_2SO_3+NaHSO_3+3H_2O$
(7) $2NH_4OH+SO_2+H_2O \rightarrow (NH_4)_2SO_3+2H_2O$
(8) $NH_4OH+SO_2+H_2O \rightarrow NH_4HSO_3+H_2O$
(9) $3NH_4OH+2SO_2+2H_2O \rightarrow$
    $(NH_4)_2SO_3+NH_4HSO_3+3H_2O$ Using the sodium-base acids as an example, the ratio of $Na/SO_2$ varies depending upon which reaction takes place. For example, if Reaction 1 occurs the solution contains $Na_2SO_3$ and $H_2O$, the ratio of $Na/SO_2$ will be 0.719. If Reaction 2 occurs the solution contains $NaHSO_3$ and $H_2O$ the ratio of $Na/SO_2$ will be 0.359 and if Reaction 3 above occurs the ratio of $Na/SO_2$ will be 0.539. A solution that has an $Na/SO_2$ ratio of 0.330 contains $NaHSO_3$ and $H_2SO_3$. If the ratio were greater than 0.359 but less than 0.719, the solution would be a mixture of $Na_2SO_3$ and $NaHSO_3$.

Thus, it can be seen that knowing the value of the ratio of $Na/SO_2$, the constituents present in the solution can be determined. Also, knowing the values of Na and $SO_2$, the concentration of each constituent can be determined and hence the solution analyzed. The $Na/SO_2$ ratios that we have described with respect to a sodium-base solution can also be extended to the ammonia-base acid.

While in accordance with the provisions of the statutes we have illustrated and described herein the best form and mode of operation of the invention now known to us, those skilled in the art will understand that changes may be made in the form of the apparatus disclosed without departing from the spirit of the invention covered by our claims, and that certain features of our invention may sometimes be used to advantage without a corresponding use of other features.

What is claimed is:

1. A method of controlling the concentration of at least two combinations of ingredients in a chemical composition including simultaneously determining combinations of some of the ingredients in the chemical composition comprising separately measuring at least two physical characteristics of the composition, converting each of said measurements to a separate impulse, and correlating together said separate impulses to determine the combinations of some of the ingredients in said chemical composition; and regulating the addition of at least two modifying components to said composition in response to the correlation of said impulses.

2. The method according to claim 1, wherein said step of correlating includes combining simultaneous impulses in a first relationship to give a physical representation of the composition, combining the same simultaneous impulses in at least one other relationship to give at least one other physical representation of the composition, and converting said representations to indications of the concentrations of at least two of the combinations in said composition.

3. The method of claim 1, wherein said composition is a solution of an alkali metal oxide, and sulphur oxide.

4. The method of claim 3, wherein said alkali metal oxide consists of magnesium oxide.

5. The method of claim 2, wherein said magnesium oxide containing solution contains as combinations magnesium bisulfite and magnesium monosulfite.

6. The method of claim 3, wherein said physical characteristics comprise electrical conductivity of the solution and the specific gravity of the solution.

7. Apparatus for controlling the concentration of at least two combinations of ingredients in a chemical composition including means for simultaneously determining the combination of some of the ingredients in the chemical composition comprising means for separately measuring at least two physical characteristics of the composition, means for converting each of said separate measurements to a separate impulse, and means for correlating together said separate impulses to determine combinations of some of the ingredients in said chemical composition; and means responsive to the correlation of said separate impulses for regulating the addition of at least two modifying components to said composition.

8. The apparatus according to claim 7, wherein said means for correlating includes means for combining simultaneous impulses in a first relationship to give a physical representation of the composition, means for combining the same simultaneous impulses in at least one other relationship to give at least one other physical representation of the composition, and means for converting said representations to indications of the concentration of at least two of the combinations in said composition.

9. Apparatus for continuously determining the concentration of at least two of the chemical compounds in a chemical solution which comprises means for continuously measuring one physical characteristic of said solution to obtain a first continuous series of instantaneous values, means for simultaneously and continuously measuring a second physical characteristic of said solution to simultaneously obtain a second continuous series of instantaneous values, means for combining simultaneous values from the first and second series of values in a first relationship to give a physical representation of the solution, means for combining the same simultaneous values in at least one other relationship to give at least one other physical representation of the solution, and means for converting the said representations to indications of the concentration of at least two of said chemical compounds in said chemical solution.

10. Apparatus according to claim 9, wherein said chemical solution comprises a magnesium base liquor.

11. Apparatus according to claim 9, wherein said chemical solution comprises a sodium base liquor.

12. Apparatus according to claim 9, wherein said chemical solution comprises an ammonium base liquor.

13. Apparatus according to claim 9, wherein said chemical solution comprising a calcium base liquor.

14. Apparatus according to claim 9, wherein said physical characteristics comprise measurements of any combination of density, specific gravity, conductivity, viscosity, partial vapor pressure, refractive index or pH.

15. Apparatus for controlling the concentration of magnesium bisulphite and magnesium monosulphite in a chemical solution formed from the combination of magnesium oxide, sulfur dioxide, and water comprising means for determining the concentrations of magnesium bisulphite and magnesium monosulphite in the solution which comprises means for continuously measuring the specific gravity of said solution to obtain a first series of instantaneous values, means for simultaneously and continuously measuring the electrical conductivity of said solution to obtain a continuous second series of instantaneous values, means for combining simultaneous values from the first and second series of values in a first relationship to give a physical representation of the solution, means for combining the same simultaneous values in at least one other relationship to give at least one other physical representation of the solution, means responsive to the physical representations for regulating the addition of water and magnesium oxide to said solution.

16. Apparatus according to claim 15, wherein means are provided for correcting said values of the solution to compensate for impurities in said solution, and means are provided for correcting said values for deviations in the temperature of the solution from a selected base temperature.

References Cited

UNITED STATES PATENTS

| | | | |
|---|---|---|---|
| 2,627,453 | 2/1953 | Sheen | 23—253 |
| 2,722,658 | 11/1955 | Richards | 23—259 XR |
| 3,096,157 | 7/1963 | Brown et al. | 23—232 |
| 3,230,048 | 1/1966 | Skeggs | 23—253 |
| 3,293,320 | 12/1966 | Magearl et al. | 23—253 XR |
| 3,399,037 | 8/1968 | Eckfeldt | 23—253 XR |
| 2,927,871 | 3/1960 | Mancke et al. | 23—230 XR |
| 3,074,277 | 1/1963 | Hill | 23—253 XR |

MORRIS O. WOLK, Primary Examiner

R. E. SERWIN, Assistant Examiner

U.S. Cl. X.R.

23—131, 253; 235—151.12